(12) United States Patent
Lopez-Pino (10) Patent No.: US 8,807,094 B1
(45) Date of Patent: Aug. 19, 2014

(54) HYBRID MULTI-POWER STROKE ENGINE

(71) Applicant: Emilio D. Lopez-Pino, Miami, FL (US)

(72) Inventor: Emilio D. Lopez-Pino, Miami, FL (US)

( * ) Notice: Subject to any disclaimer, the term of this patent is extended or adjusted under 35 U.S.C. 154(b) by 0 days.

(21) Appl. No.: 14/036,091

(22) Filed: Sep. 25, 2013

(51) Int. Cl.
*F02M 25/028* (2006.01)
(52) U.S. Cl.
CPC .................. *F02M 25/028* (2013.01)
USPC ........... 123/25 P; 123/64; 60/39.182; 60/39.3
(58) Field of Classification Search
CPC . F02M 25/022; F02M 25/032; F02M 25/038; F01K 3/00; F01K 23/10
USPC ............ 123/25 P, 64; 60/39.182, 39.3, 39.53, 60/227, 775
See application file for complete search history.

(56) References Cited

U.S. PATENT DOCUMENTS

| | | |
|---|---|---|
| D252,148 S | 6/1979 | Schramm |
| 4,442,673 A | 4/1984 | Haworth |
| 4,590,766 A | 5/1986 | Striebich |
| 4,706,462 A | 11/1987 | Soltermack |
| 5,191,766 A | 3/1993 | Vines |
| 7,997,080 B2 * | 8/2011 | Harmon et al. ................. 60/670 |
| 8,061,140 B2 * | 11/2011 | Harmon, Sr. .................... 60/670 |
| 8,109,097 B2 * | 2/2012 | Harmon et al. ................. 60/670 |
| 2010/0229554 A1 | 9/2010 | Henwood |

* cited by examiner

*Primary Examiner* — Noah Kamen
*Assistant Examiner* — Grant Moubry (57) ABSTRACT

The hybrid multi-power stroke engine is an improved internal combustion engine that includes a steam engine integrated into the design, which derives power from heat generated at the combustion chamber as well as exhaust manifold of the internal combustion engine. The steam engine injects and exhausts superheated steam directly into the cylinder on a $5^{th}$ and $6^{th}$ stroke thereby alternating the engine from internal combustion to steam. A water tank is in fluid communication with a water pump and piping that passes across the cylinder block whereby heat is removed therefrom. The piping is in fluid communication with an exhaust manifold that transfers superheated steam to an electronic steam intake valve that injects the superheated steam on a $5^{th}$ stroke. An auxiliary camshaft opens an exhaust steam valve on a $6^{th}$ stroke in order to exhaust the expanded steam from the cylinder.

16 Claims, 6 Drawing Sheets

HYBRID MULTI-POWER STROKE ENGINE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of internal combustion engines, more specifically, a hybridized internal combustion engine that uses heat generated to drive a steam engine in concert therewith.

B. Discussion of the Prior Art

As will be discussed immediately below, no prior art discloses an internal combustion engine that includes a steam engine that derives power from the capture of heat generated inside of the cylinder where combustion of the hydrocarbon fuel occurs; wherein the steam engine utilizes a water tank that is in fluid communication with a water pump and piping that passes across the cylinder block whereby heat is removed therefrom; wherein the piping is in fluid communication with an exhaust manifold that transfers the superheated steam to the cylinder of camshaft times opening of steam valves that exhaust the superheated steam with respect to the cylinder and an electronic valve to inject the superheated steam into the cylinder; wherein the internal combustion engine utilizes combustion of a hydrocarbon for four consecutive strokes, and utilizes superheated steam as a steam engine on a $5^{th}$ and $6^{th}$ stroke such that the internal combustion engine harnesses energy from the superheated steam thereby increasing the overall efficiency of the internal combustion engine; wherein the steam engine may also includes a compressed air tank that supplies pressurized air to the superheater during a cold start.

The Henwood Patent Application Publication (U.S. Pub. No. 2010/0229554) discloses a hybrid engine for an automobile that uses exhaust from the gasoline powered engine to heat a boiler to power an external steam powered engine. However, the exhaust heat derived from the engine does not work with an exhaust manifold and at the combustion chamber in order to superheat steam used to drive a steam piston.

The Vines (U.S. Pat. No. 5,191,766) discloses a hybrid engine for a vehicle in which the exhaust from the internal combustion engine is used to heat water and create steam to power turbines that will augment the power needed to move the pistons. However, the power turbine does not gather heat from the exhaust manifold as well as at the combustion chamber in order to drive a steam engine.

The Soltermack (U.S. Pat. No. 4,706,462) discloses an improved method of driving a vehicle engine in which water is heated using the exhaust from the engine creating steam that will power at least one piston. However, the steam does not derive heat from both the exhaust manifold and at the combustion chamber.

The Striebich (U.S. Pat. No. 4,590,766) discloses a waste heat steam turbine for an automobile engine that will assist the internal combustion engine in driving the pistons, increasing fuel efficiency and limiting exhaust of the vehicle. Again, the turbine does not derive heat from both the cylinder and at the exhaust manifold.

The Haworth (U.S. Pat. No. 4,442,673) discloses a dual proces engine for an automobile that uses an internal combustion engine and a steam powered external engine in which the steam is created using the heat from the exhaust of the internal combustion engine. Again, the heat is derived solely from the exhaust and not in concert with heat located at the cylinder head.

While the above-described devices fulfill their respective and particular objects and requirements, they do not describe an internal combustion engine that includes a steam engine that derives power from the capture of heat generated inside of the cylinder where combustion of the hydrocarbon fuel occurs; wherein the steam engine utilizes a water tank that is in fluid communication with a water pump and piping that passes across the cylinder block whereby heat is removed therefrom; wherein the piping is in fluid communication with an exhaust manifold that transfers the superheated steam to the cylinder of the respective internal combustion engine; wherein an auxiliary camshaft times opening of steam valves that exhaust the superheated steam with respect to the cylinder and an electronic valve to inject the superheated steam into the cylinder; wherein the internal combustion engine utilizes combustion of a hydrocarbon for four consecutive strokes, and utilizes superheated steam as a steam engine on a $5^{th}$ and $6^{th}$ stroke such that the internal combustion engine harnesses energy from the superheated steam thereby increasing the overall efficiency of the internal combustion engine; wherein the steam engine may also includes a compressed air tank that supplies pressurized air to the superheater during a cold start. In this regard, the hybrid multi-power stroke engine departs from the conventional concepts and designs of the prior art.

SUMMARY OF THE INVENTION

The hybrid multi-power stroke engine is an improved internal combustion engine that includes a steam engine integrated into the design, which derives power from heat generated at the combustion chamber as well as exhaust manifold of the internal combustion engine. The steam engine injects and exhausts superheated steam directly into the cylinder on a $5^{th}$ and $6^{th}$ stroke thereby alternating the engine from internal combustion to steam. A water tank is in fluid communication with a water pump and piping that passes across the cylinder block whereby heat is removed therefrom. The piping is in fluid communication with an exhaust manifold that transfers superheated steam to an electronic steam intake valve that injects the superheated steam on a $5^{th}$ stroke. An auxiliary camshaft opens an exhaust steam valve on a $6^{th}$ stroke in order to exhaust the expanded steam from the cylinder. The steam engine may also includes a compressed air tank that supplies pressurized air to the superheater during a cold start.

It is an object of the invention to provide an internal combustion engine that includes an auxiliary steam engine that derives heat from the exhaust manifold as well as the cylinder block of the internal combustion engine, and utilizes superheated steam to alternate the overall engine from internal combustion to steam powered in order to increase the overall efficiency.

A further object of the invention is to provide a steam engine that includes a water tank, boiler, steam superheater, and compressed air tank in order to circulate water that is transformed into superheated steam that in turn is injected into the cylinder on a 5$^{th}$ stroke, and subsequently exhausted on a 6$^{th}$ stroke.

These together with additional objects, features and advantages of the hybrid multi-power stroke engine will be readily apparent to those of ordinary skill in the art upon reading the following detailed description of presently preferred, but nonetheless illustrative, embodiments of the hybrid multi-power stroke engine when taken in conjunction with the accompanying drawings.

In this respect, before explaining the current embodiments of the hybrid multi-power stroke engine in detail, it is to be understood that the hybrid multi-power stroke engine is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hybrid multi-power stroke engine.

It is therefore important that the claims be regarded as including such equivalent construction insofar as they do not depart from the spirit and scope of the hybrid multi-power stroke engine. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A hybrid multi-power stroke engine 100 (hereinafter invention) includes a plurality of internal combustion cylinders 101 that are a part of an internal combustion engine 150. Each of the internal combustion cylinders 101 is enclosed with a water jacket 200 that includes water piping 210 that transfers heat generated inside of the internal combustion cylinder 101 to water 300 flowing there through. It shall be noted that the term "internal combustion engine" 150 is being used loosely to refer to the components of the invention 100 that involve burning of a hydrocarbon. However, the invention 100 has a steam engine 250 that overlaps a portion of the internal combustion engine 150 portion of the invention 100. The steam engine 250 utilizes the cylinders 101 to inject superheated steam that moves a piston 102 up and down within the cylinder 101. Moreover, the steam engine 250 operates when the internal combustion engine 150 is not burning a hydrocarbon.

Figure 1:
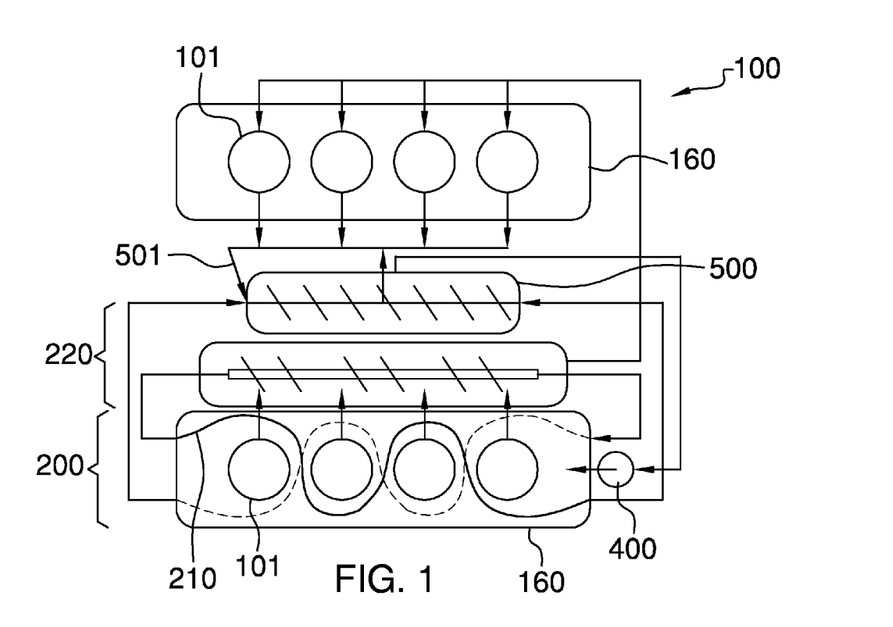
FIG. 1 illustrates a diagram of the steam engine integrated into the internal combustion engine.
Figure 2:
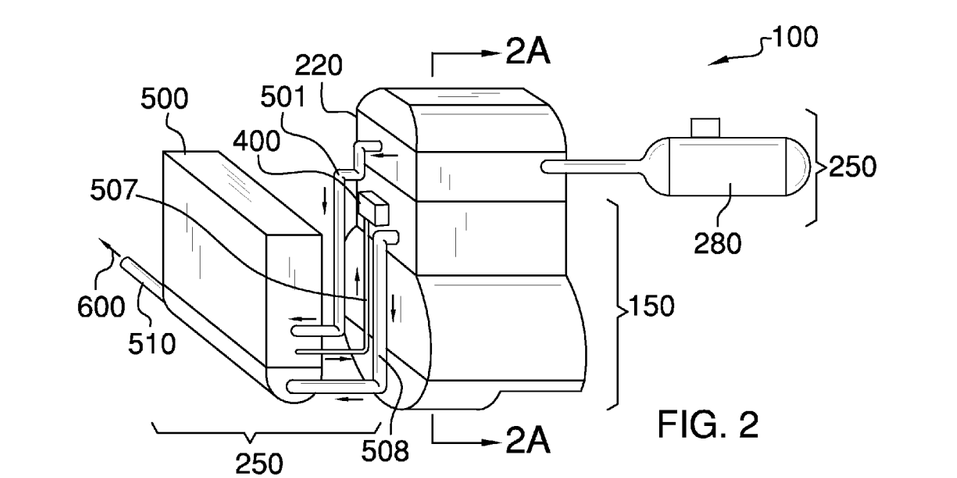
FIG. 2 illustrates a detailed view of the overall engine.
Figure 2A:
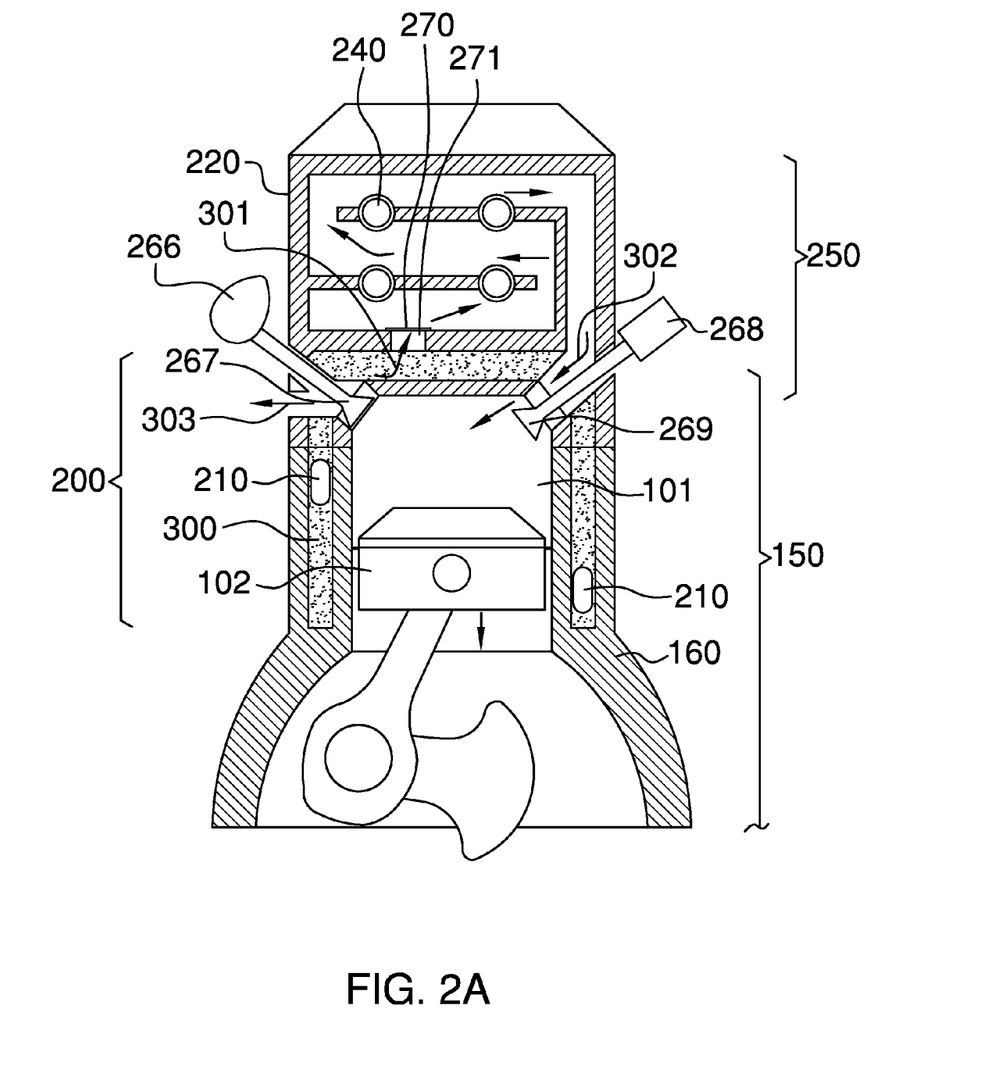
FIG. 2A illustrates a cross-sectional along line 2A-2A of FIG. 2.
Figure 3:
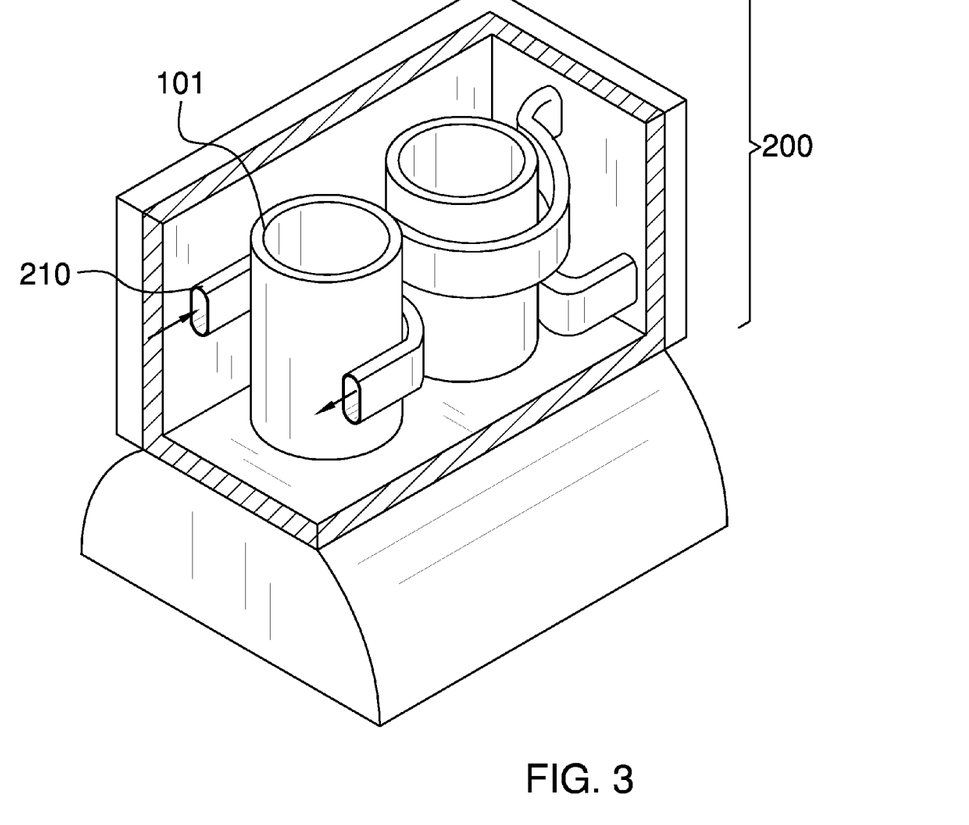
FIG. 3 illustrates a diagram of the water jacket componentry integrated around the cylinders of the engine block.

A water jacket 200 is integrated into the design of an engine block 160, and which includes an open volume around the cylinders 101 of the internal combustion engine 150. The water jacket 200 enables the water 300 to pass across the exterior of the cylinders 101 in order to remove heat, and turn the water 300 into steam 301. The water jacket 200 also includes secondary exhaust pipes 210 that traverse there through, and which introduce excess heat from exhaust of the invention 100 into the water 300.

Figure 4:
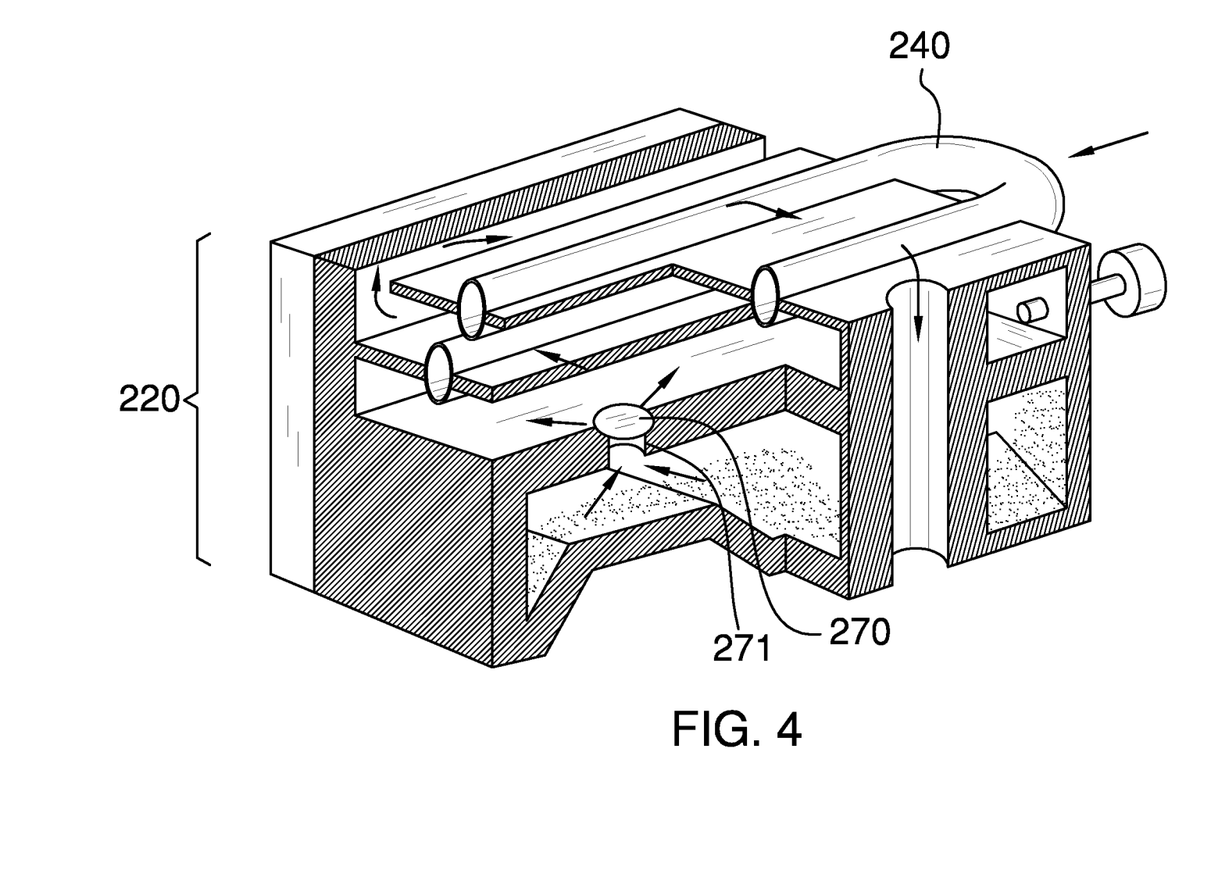
FIG. 4 illustrates a diagram of the superheater component of the steam engine, which is located atop of the engine block.

Located directly above the water jacket 200 is a steam superheater 220. The steam superheater 220 is responsible for extracting heat from primary exhaust pipes 240, and directing said heat to the steam 301 located therein. The primary exhaust pipes 240 pipe exhaust directly from cylinders after the internal combustion process has occurred in order to add heat energy to steam 301 located in the steam superheater 220, and which aids in transforming of said steam 301 to superheated steam 302. It shall be noted that the primary exhaust pipes 240 shall represent what is known as the "first stage", and that a "second stage" shall involve piping exhaust gases through the water jacket 200 in order to remove any remaining heat energy from the exhaust gases to the steam 301 located in the water jacket 200.

As previously mentioned, the water 300 is heated to steam 301 in the water jacket 200. The steam 301 passes into the steam superheater 220, and is turned into superheated steam 302. The superheated steam 302 is injected into the cylinder 101 on a fifth stroke of the internal combustion engine 150. That being said, the internal combustion engine 150 is modified to include 6 total strokes. Strokes 1-4 are dedicated to a traditional internal combustion engine stroking, and strokes 5-6 convert the internal combustion engine 150 to use with the steam engine 250.

The invention 100 includes an auxiliary camshaft 266, which opens and closes a steam exhaust valve 267 on the 6$^{th}$ stroke. The invention 100 also includes an electromagnetic valve 268 that opens and closes a steam intake valve 269 on the 5$^{th}$ stroke. The 5$^{th}$ stroke injects the superheated steam 302 into the cylinder 101, and the superheated steam 302 is used to propel the piston 102 downwardly. Once the superheated steam 302 has propelled the piston 102 downwardly, the superheated steam 302 is then to be referenced as expanded steam 303. The steam exhaust valve 267 enables the expanded steam 303 to exit the cylinder 101 on the 6$^{th}$ stroke. The expanded steam 303 exiting the cylinder 101 at the steam exhaust valve 267 is piped directly to a first pipe 501 towards a water tank 500.

A flapper valve 270 is located and interfaces a portal 271 located between the water jacket 200 and the steam superheater 220. After the expanded steam 303 exits the cylinders 101 via the steam exhaust valve 267, the expanded steam 303 is piped over to the water tank 500 via the first pipe 501. The water tank 500 is located adjacent to the engine block 160. The water tank 500 enables the water 300, the steam 301, and the expanded steam 303 to be re-circulated such that the steam engine 250 componentry of the invention 100 is mostly a closed system, and loses a minimalized amount of steam 301. However, excess energy in the form of excess steam 301 is allowed to escape the water tank 501 in order to maintain useful work of the steam engine 250, and will be explained further below.

Figure 5:
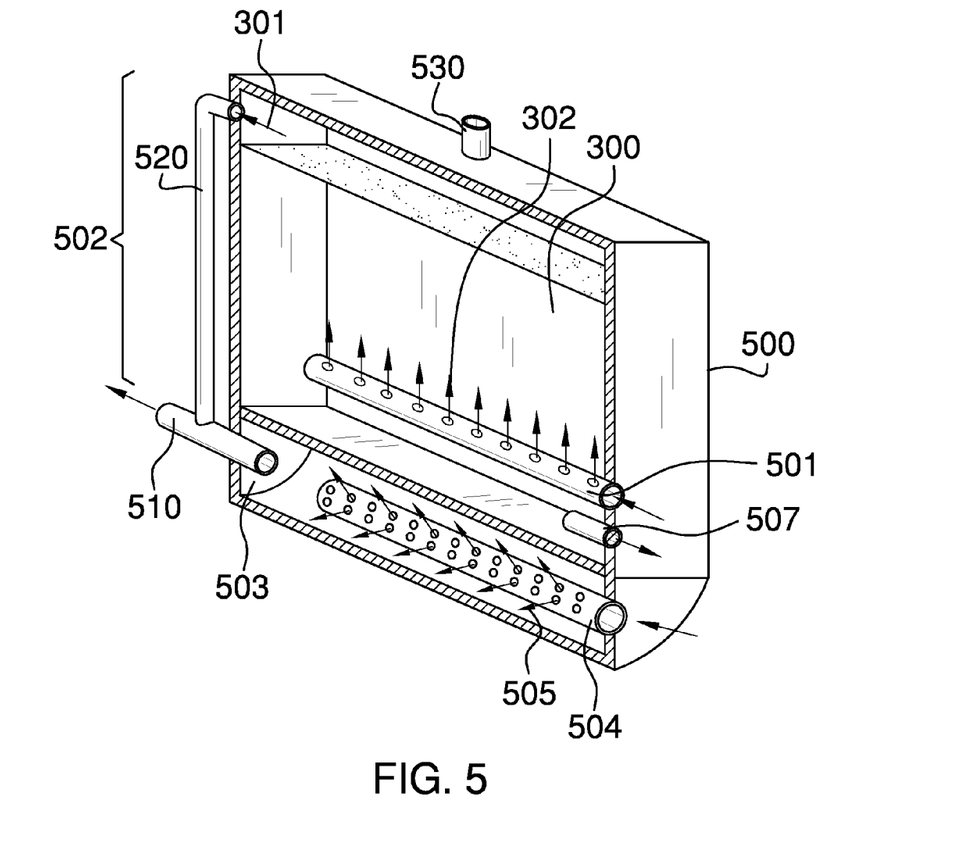
FIG. 5 illustrates a diagram of the water tank.
Figure 6:
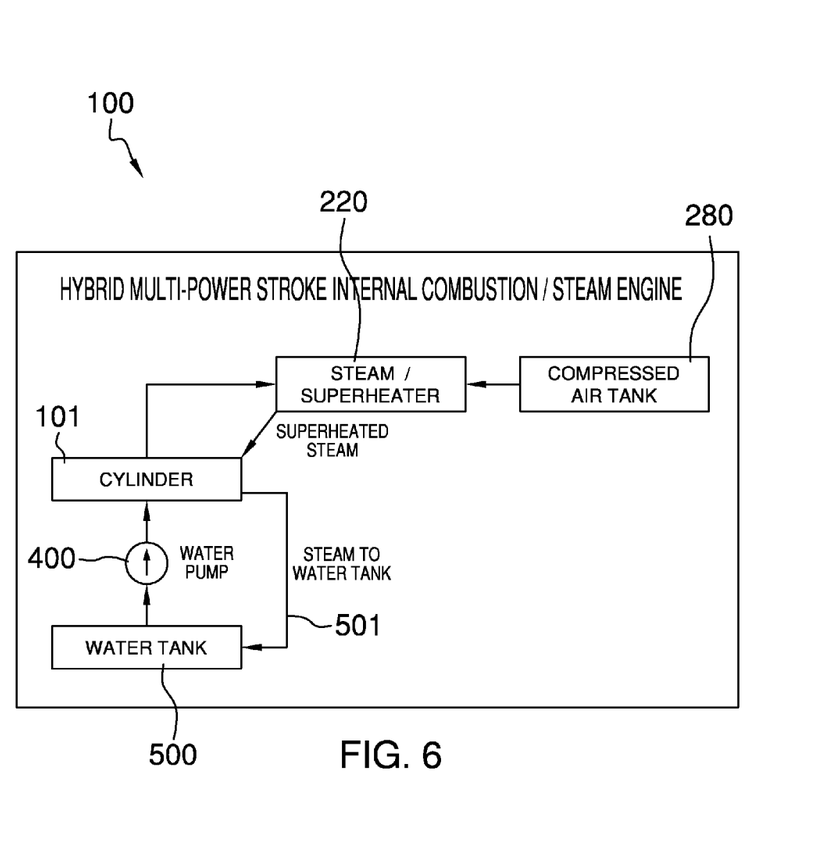
FIG. 6 illustrates a block diagram of the steam engine.

The first pipe 501 provides fluid communication between the steam exhaust valve 267 and cylinder 101 to the water tank 500. Expanded steam 303 exits the cylinder 101 to the water tank 500, and which is then condensed down to a liquid form. The water tank 500 stores water 300 in a first compartment 502. A separate second compartment 503 is located underneath the first compartment 502. The second compartment 503 is not in fluid communication with the first compartment 502. Moreover, the second compartment 503 includes an exhaust gas muffler 504 that passes there through, and enables heat of internal combustion engine exhaust 505 to transfer up to the first compartment 502. The heat of internal combustion engine exhaust 505 of the exhaust gas muffler 504 is utilized and conserved to aid in improving the efficiency of the steam engine 250 componentry by adding heat energy back to the water 300 before being pumped to the water jacket 200.

The second compartment 503 is in fluid communication with an exhaust pipe 510 that exhausts to the atmosphere 600. The exhaust pipe 510 connects with a return pipe 520 that is in fluid communication with the first compartment 502. The return pipe 520 acts to exhaust excess steam 301 from within the first compartment 502. The first compartment 502 includes a water inlet 530 to enable re-filling of the first compartment 501 as needed. The invention 100 utilizes a pump 400 to transfer water 300 from the first compartment 502 via third pipe 507 to the water jacket 200.

The secondary exhaust pipes 210 pipes the internal combustion engine exhaust 505 across the water jacket 200 before being piped via a fourth pipe 508 over to the second compartment 503. A compressed air tank 280 is included with the invention 100, and may be used to propel pressurized air through the cylinder 101, and is ideally useful in starting the $5^{th}$ stroke operation of the steam engine 250 during a cold start. The compressed air tank 280 is only operated as needed.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hybrid multi-power stroke engine comprising:
 a steam engine configured for use with a six-stroke internal combustion engine operating to combust a hydrocarbon fuel during strokes one through four, wherein heat energy formed from the internal combustion engine is collected and transferred at an engine block as well as heat of internal combustion engine exhaust in order to transform water to steam, and to superheated steam that is injected into a cylinder of said engine block during a fifth stroke, and which is subsequently exhausted from said cylinder as expanded steam during a sixth stroke;
 wherein the steam engine introduces said superheated steam to said cylinder in lieu of said hydrocarbon fuel during strokes five through six in order to increase the overall efficiency of said hybrid multi-power stroke engine.

2. The hybrid multi-power stroke engine as described in claim 1 wherein the cylinders of the engine block are surrounded with a water jacket; wherein the water jacket is an exchanger that captures heat from the cylinders as well as from heat of the internal combustion engine exhaust, and transfers said heat to water, which turns into steam.

3. The hybrid multi-power stroke engine as described in claim 2 wherein the water is introduced into the water jacket from a water tank located adjacent the engine block.

4. The hybrid multi-power stroke engine as described in claim 3 wherein a pump transfers water from the water tank to the water jacket.

5. The hybrid multi-power stroke engine as described in claim 4 wherein the water jacket includes water piping that transfers heat of the internal combustion engine to water flowing there through; wherein the water jacket is integrated into the design of the engine block, and which includes an open volume around the cylinders of the internal combustion engine.

6. The hybrid multi-power stroke engine as described in claim 5 wherein located directly above the water jacket is a steam superheater; wherein the steam superheater is responsible for extracting heat from primary exhaust pipes, and directing said heat to the steam located therein; wherein steam exits the water jacket to the steam superheater, and is turned into superheated steam; wherein the steam superheater includes primary exhaust pipes that pipe exhaust gases from the $4^{th}$ stroke in order to exchange heat back to superheated steam yet to be injected into the cylinder.

7. The hybrid multi-power stroke engine as described in claim 6 wherein superheated steam is injected into the cylinder on the fifth stroke of the internal combustion engine; wherein an auxiliary camshaft opens and closes a steam exhaust valve on the sixth stroke.

8. The hybrid multi-power stroke engine as described in claim 7 wherein an electromagnetic valve opens and closes a steam intake valve on the fifth stroke; wherein the fifth stroke injects the superheated steam into the cylinder, and the superheated steam is used to propel the piston downwardly, and the steam exhaust valve enables the expanded steam to exit the cylinder on the sixth stroke; wherein the expanded steam exiting the cylinder at the steam exhaust valve is piped via a first pipe to the water tank.

9. The hybrid multi-power stroke engine as described in claim 8 wherein a flapper valve is located and interfaces a portal located between the water jacket and the steam superheater; wherein after the expanded steam exits the cylinders via the first pipe, the expanded steam is piped over to the water tank; wherein the water tank enables the water, the steam, and the expanded steam to be re-circulated and condensed.

10. The hybrid multi-power stroke engine as described in claim 9 wherein a first pipe provides fluid communication between the steam exhaust valve and the cylinder to the water tank; wherein the expanded steam exits the cylinder to the water tank, and which is then condensed down to a liquid form; wherein the water tank stores water in a first compartment; wherein a separate second compartment is located underneath the first compartment; wherein the second compartment is not in fluid communication with the first compartment.

11. The hybrid multi-power stroke engine as described in claim 10 wherein the second compartment includes an exhaust gas muffler that passes there through, and enables heat of internal combustion engine exhaust to transfer up to the first compartment.

12. The hybrid multi-power stroke engine as described in claim 11 wherein the second compartment is in fluid communication with an exhaust pipe that exhausts to the atmosphere; wherein the exhaust pipe connects with a return pipe that is in fluid communication with the first compartment; wherein the return pipe acts to exhaust excess steam from within the first compartment.

13. The hybrid multi-power stroke engine as described in claim 11 wherein the first compartment includes a water inlet to enable re-filling of the first compartment with more water as needed.

14. The hybrid multi-power stroke engine as described in claim 13 wherein the pump transfers water from the first compartment via a third pipe to the water jacket.

15. The hybrid multi-power stroke engine as described in claim 14 wherein primary exhaust pipes pipe internal combustion engine exhaust directly from cylinders after the internal combustion process has occurred in order to add heat energy to steam located in the steam superheater, and which aids in transforming of said steam to superheated steam; wherein the secondary exhaust pipes are downline from the primary exhaust pipes; wherein the secondary exhaust pipes transfer the internal combustion engine exhaust across the water jacket before being piped via a fourth pipe over to the second compartment.

16. The hybrid multi-power stroke engine as described in claim 15 wherein a compressed air tank is included, and used to propel pressurized air through the cylinder during a cold start of the fifth stroke operation of the steam engine.

\* \* \* \* \*